Patented Nov. 1, 1938

2,134,736

UNITED STATES PATENT OFFICE 2,134,736

LUBRICANT

Raymond Reuter, Medford Lakes, N. J., assignor to The Atlantic Refining Company, Philadelphia, Pa., a corporation of Pennsylvania No Drawing. Application April 19, 1935, Serial No. 17,257

2 Claims. (Cl. 87—9)

The present invention relates to the art of lubrication, and more particularly to the lubrication of surfaces engaging under extreme pressure, as for example, the rubbing surfaces of hypoid gears, free wheeling transmissions, speed reducers and the like.

The general tendency in the design of modern machinery has been toward a higher ratio between power and "dead weight". This is especially true in the automotive industry, and in recent years certain types of gears and other mechanisms have been developed with the operating pressures on the working surfaces so high that ordinary mineral oil lubricants will not provide sufficient lubrication for satisfactory operation.

Heretofore it has been thought that lubrication consists in maintaining a film of oil between the rubbing surfaces, thereby preventing them from coming into contact with one another and thus preventing wear. That this condition exists in well lubricated bearings is well known, but this conception of lubrication does not apply to highly loaded gears. In well lubricated bearings the loads rarely exceed 2000 lbs. per sq. in. projected area and the rubbing speeds are generally high enough to maintain a film of oil which separates the rubbing surfaces. In automobile gears, the pressures between gear teeth reach very high values and even the most viscous oils or greases cannot be retained between the surfaces of the teeth in a sufficiently thick film to prevent metal to metal contact, particularly when operating temperatures of 210° F. or higher are commonly encountered.

It has been known that compounded lubricants such as, for example, mineral oils containing fatty oils, fatty acids, metallic soaps, sulfur or combined chlorine, possess lubricating qualities which render them suitable for use under high operating pressures. These compounded oils function satisfactorily under conditions which would cause failure of an unblended mineral oil, if used alone. It is believed that the successful use of such compounded oils depends upon the adsorption and reaction or union of certain components of these oils with the metal surfaces whereby a film of metallic compound, such as, for example, iron sulfide is formed. It appears that such a film or plating has a low coefficient of friction and that satisfactory operation of heavily loaded bearings or gears depends upon the formation and maintenance of such a film, and not upon the retaining of a film of oil between the bearing surfaces. The hydrocarbon oil constituents of an extreme pressure lubricant serves primarily to remove frictional heat, to wash away any solid particles which may result from wear, and to prevent oxidation of the engaging surfaces.

I have discovered that the esters of the polybasic carboxylic acids, and more particularly the esters of the dibasic carboxylic acids, when admixed with hydrocarbon oils, are of special utility in the field of extreme pressure lubrication. The esters which may be employed in accordance with my invention include the mono and polyhydric alcohol esters of the dibasic carboxylic acids such as, for example, oxalic, malonic, succinic, glutaric, adipic, pimelic, suberic, azelaic, sebacic, fumaric, maleic and the like. Other esters which may be employed to advantage are the mono and polyhydric alcohol esters of the polybasic carboxylic acids such as for example, tricarballylic, phthalic, isophthalic, trimesic, trimellitic and the like.

In preparing my lubricant, I add to a suitable mineral oil one or a mixture of two or more of the esters of the polybasic carboxylic acids in quantity sufficient to improve the lubricating value of the oil to any desired extent, depending upon the operating conditions under which the lubricant is to be used. I have found that the quantity of ester required, in general, does not exceed substantially 10% by weight of my composition. Quantities of ester as small as 3%, or even 1% or less, in certain instances, have been found to improve lubricating oils to a satisfactory extent. In preparing my lubricant, I may obtain a homogeneous solution of ester in mineral oil by agitating the mixture at normal or elevated temperatures, or I may dissolve the ester in a suitable solvent and add the resulting solution to the oil, thereafter removing the solvent by vaporization.

Typical examples of my improved lubricants are shown in the following table. The esters employed were admixed with a hydrocarbon oil having a viscosity of 265 seconds Saybolt Universal at 100° F., and an A. P. I. gravity of 24.5° at 60° F. The blends thus obtained were tested in an Almen extreme pressure lubricant testing machine at 200 R. P. M., and the pressure in lbs./sq. in. projected bearing area carried before failure, indicated the load-bearing capacity of the lubricant.

ple, the crankcase bearings and cylinder walls of internal combustion engines. Furthermore, my compounded oil may be utilized as a base in the preparation of thickened oils, i. e., greases, by the addition thereto of soaps or other conventional thickening agents, whereby to obtain lubricants of desired viscosity. My compounded oil may also be blended with fatty oil, or the esters alone may be admixed with fatty oils, for the lubrication of mechanisms in which the presence of a fatty oil is desirable.

When, in the appended claims, the term "viscous hydrocarbon oil" is employed, such term is to Lubricant, percent by volume

| Hydrocarbon oil | Ester | Formula | Almen test, pressure lbs./sq. in. projected bearing area before failure |
|---|---|---|---|
| 100% | | $COOC_4H_9(CH_2)_8COOC_4H_9$ | 3,000 |
| 95% | 5% butyl sebacate | | 22,000 |
| 97% | 3% butyl sebacate | | 16,000 |
| 99% | 1% butyl sebacate | | 10,000 |
| 95% | 5% dibutoxy ethyl phthalate | benzene ring with —CO.OCH$_2$CH$_2$OC$_4$H$_9$ and —CO.OCH$_2$CH$_2$OC$_4$H$_9$ | 21,000 |
| 95% | 5% dimethoxy ethyl phthalate | benzene ring with —CO.OCH$_2$CH$_2$OCH$_3$ and —CO.OCH$_2$CH$_2$OCH$_3$ | 21,000 |
| 95% | 5% dibutyl phthalate | benzene ring with —CO.OC$_4$H$_9$ and —CO.OC$_4$H$_9$ | 15,000 |
| 95% | 5% butyl phthalate butyl glycollate | benzene ring with —CO.OC$_4$H$_9$ and —CO.OCH$_2$CO.OC$_4$H$_9$ | 13,000 |
| 97% | 3% butyl acetyl ricinoleate | $CH_3(CH_2)_5CHCH_2CH=CH(CH_2)_7CO.OC_4H_9$ with $OCO.CH_3$ branch | 10,000 |

It will be seen, from the above examples, that the addition of polybasic carboxylic acid esters to a mineral oil improves the lubricating value of such an oil to a marked extent, and imparts to the oil certain properties which render it suitable for use in the lubrication of surfaces engaging under extreme pressure While I have described my invention with reference to the lubrication of gears and bearings operating under heavy loads, I do not intend to limit myself thereto, but contemplate the use of my lubricant in operations such as the cutting and boring of metals, in which conditions of extreme pressure and temperature are normally encountered, and also in the lubrication of mechanisms operating under moderate pressures, as for exambe understood to comprehend hydrocarbon oil having a Saybolt Universal viscosity at 100° F. of 100 seconds or more.

What I claim is:

1. A lubricant comprising a viscous hydrocarbon oil and an ester of a polybasic carboxylic acid from the group consisting of butyl sebacate, dibutoxy ethyl phthalate and dimethoxy ethyl phthalate.

2. A lubricant comprising a viscous hydrocarbon oil and from about 3% to about 5% of an ester of a polybasic carboxylic acid from the group consisting of butyl sebacate, dibutoxy ethyl phthalate and dimethoxy ethyl phthalate.

RAYMOND REUTER